United States Patent
Murakowski et al.

(10) Patent No.: US 6,603,558 B2
(45) Date of Patent: Aug. 5, 2003

(54) MICRO-RING CAVITY GYROSCOPE WITH MAGNETIC FIELD LOCK-IN MINIMIZATION

(75) Inventors: Janusz A. Murakowski, Newark, DE (US); Dennis W. Prather, Landenburg, PA (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 09/912,944

(22) Filed: Jul. 25, 2001

(65) Prior Publication Data

US 2003/0020918 A1 Jan. 30, 2003

(51) Int. Cl.$^7$ .............................................. G01C 19/66
(52) U.S. Cl. ....................................... 356/461; 356/472
(58) Field of Search ................................ 356/459, 460, 356/461, 472; 372/94; 385/12

(56) References Cited

U.S. PATENT DOCUMENTS

| | | | |
|---|---|---|---|
| 3,373,650 A | | 3/1968 | Killpatrick |
| 4,913,548 A | * | 4/1990 | Vick ........................... 356/461 |
| 5,471,489 A | | 11/1995 | Thorland |
| 5,774,216 A | | 6/1998 | Priddy et al. |
| 5,790,583 A | | 8/1998 | Ho |
| 5,825,799 A | | 10/1998 | Ho |
| 5,872,877 A | | 2/1999 | Haavisto |

OTHER PUBLICATIONS

C. Ford et. al, Cavity Element for Resonant Micro Optical Gyroscope, IEEE (2000), p 285–290.

N.V. Kravtsov, et. al, The influence of frequency nonreciprocity on the emission dynamics of solid state ring lasers, Quantum Electronics 30 105–114 (2000).

E.A. Khazanov, Characteristic features of the operation of different designs of the Faraday isolator fo ra high average laser–radiation power, Quantum Electronics 30 147–151 (2000).

K. Taguchi, et. al, Experimental Investigation of a Semiconductor Ring Laser as an Optical Gyroscope, IEEE Transactions of Instrumentation and Measurement, 48 1314–1318 (1999).

K. Taguchi, et. al, Optical inertial rotation sensor using semiconductor ring laser, Electronic Letters, 34, 1775–1776 (1998).

W.W. Chow, et. al, The Ring Laser Gyro, Reviews of Modern Physics, 57, No. 1 (1985).

M. Ikeda, Self–detection of lasing characteristics for semiconductor ring laser diodes, Optical and Quantum Electronics 28, 17–23 (1996).

K. Taguchi, et. al, Proposal of a semiconductor ring laser gyroscope, Optical and Quantum Electronics, 31, 1219–1226 (1999).

D. Anderson, Optimal Gyroscopes, Scientific American, 254, p 94–99 (Apr. 1986).

A.F. Jezierski, Integrated Semiconductor Ring Lasers, IEE Proceedings, 135 Pt.J, 17–24 (Feb. 1988).

W.W. Chow, et. al, Multioscillator Laser Gyros, IEEE, p 918–935 (1980).

* cited by examiner

*Primary Examiner*—Samuel A. Turner
(74) *Attorney, Agent, or Firm*—Huntley & Associates

(57) ABSTRACT

The invention is a compact optical gyroscope based on the Sagnac effect that combines a micro-ring cavity laser comprising a magneto-optical material and a magnetic field to circumvent the lock-in phenomenon at low rates of rotation. The invention also embodies novel processes for breaking lock-in using a transverse Faraday effect.

18 Claims, 8 Drawing Sheets

MICRO-RING CAVITY GYROSCOPE WITH MAGNETIC FIELD LOCK-IN MINIMIZATION

BACKGROUND OF INVENTION

Ring laser gyrocopes based on the Sagnac effect are commonly used in many modern navigational and aerospace guidance systems. In summary, two light beams are caused to propagate in opposite directions around a closed-loop path. Rotation of this closed loop path causes the effective path length in one direction to become shorter while lengthening the effective path length in the other direction. This change in path length is a direct measure of inertial rotation. Further details regarding the general operation of a ring laser gyroscope may be found in U.S. Pat. No. 3,373,650, by J. E. Killpatrick.

The two most widely used versions for both civilian and military applications are the Ring Laser Gyroscope (RLG), and the Interferometric Fiber Optic Gyroscope (IFOG). While these are proven devices, there are limitations to the reduction in size and cost achievable with these devices. Both systems are based on the construction of relatively long closed paths that are difficult to manufacture and require a relatively large area (see for instance, the review by D. Z. Anderson in Scientific American, vol 254, #4, p. 94, April 1986). A gyroscope based on integrated solid state designs would be an attractive alternative to fiber-optic systems in terms of cost and manufacturablility, and ruggedness of design. One example is an integrated planar optical waveguide approach to a compact gyroscope as described by Ford, et al. in IEEE 2000, p. 285–290.

In recent years integrated semiconductor ring lasers of very small size have been developed. Micro-ring cavity lasers and various means to construct them are discussed by Ho, et al. in U.S. Pat. No. 5,790,583 entitled "Photonic-Well Microcavity Light Emitting Devices" and U.S. Pat. No. 5,825,799 entitled "Microcavity Semiconductor Laser" and by Jezierski, et al. in IEE Proceedings, Vol. 135, Pt. J, No. 1, p. 17–24, February 1988. More recently a semiconductor ring laser in combination with a fiber-optic loop has been characterized in the context of an optical gyroscope by Taguchi, et al. in Optical and Quantum Electronics vol. 31: 1219–1226, 1999. In this study it was verified that lock-in phenomenon was one of the most dominant noise sources.

Lock-in is a common error source in ring laser gyroscopes which has been an issue for many years. As disclosed by Killpatrick above, when the ring laser gyroscope sits at rest, or is subjected to zero input rates, the two counter-propagating waves tend to resonate together or "lock-in". This tendency to lock-in reduces the gyroscopes's ability to measure rotation at low rates. To alleviate the problem of lock-in, electronic biasing that results in the ring laser gyroscope being rotationally oscillated, was developed as described, for instance, by L. W. Priddy in U.S. Pat. No. 5,774,216 entitled "RLG Dither Noise Injection by Means of Reference Modulation"

To date there is no micro-ring cavity laser gyroscope that adequately addresses the issue of lock-in and allows a micro-ring cavity laser based gyroscope to perform at low rates of rotation.

SUMMARY OF INVENTION

The invention embodies a micro-ring cavity gyroscope with a sensitivity axis, for sensing rotational motion, comprising: at least one micro-ring cavity laser comprising a light amplifying medium and magneto-optical material capable of generating an electromagnetic standing wave; at least one standing wave detection means; and means for generating a magnetic field that at least partially immerses said micro-ring cavity laser in magnetic field, wherein said standing wave detection means senses the position of the electromagnetic standing wave with respect to said micro-ring cavity laser, and the magnetic field perturbs the electromagnetic standing wave to minimize lock-in phenomenon enabling detection of rotational motion.

The invention further embodies a novel process for changing the effective optical path length of an electromagnetic wave in a magneto-optical material comprising: applying a magnetic field to said magneto-optical material; propagating said electromagnetic wave through the magneto-optical material such that the electric component of the electromagnetic wave has a component perpendicular to the magnetic field; and changing direction of propagation of the electromagnetic wave such that a projection of the propagation direction is perpendicular to the magnetic field whereby the effective optical path length is modified.

DETAILED DESCRIPTION

Figure 1:
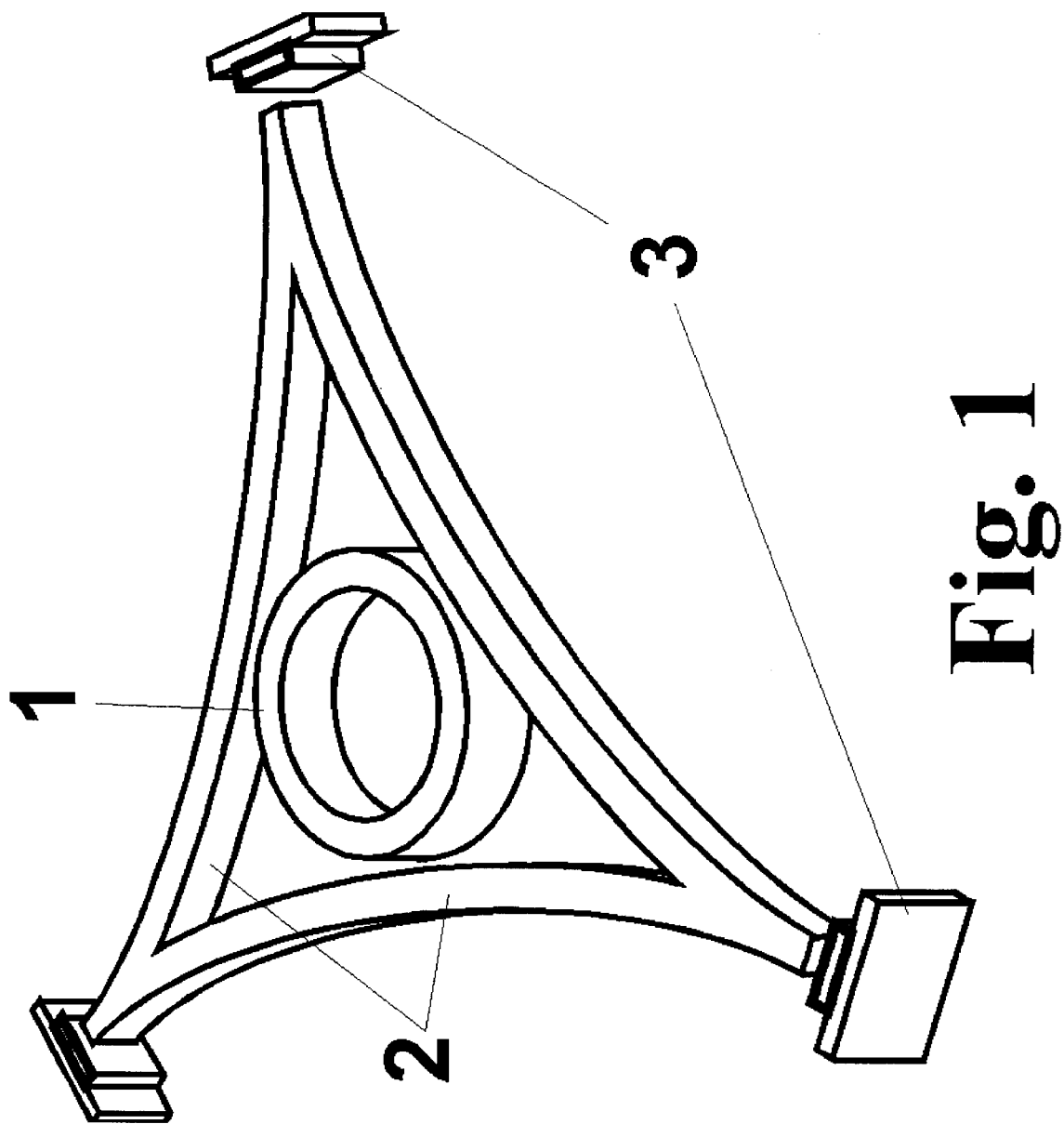
FIG. 1 illustrates a perspective view of a micro-ring-cavity laser and standing wave detection means.

The objective of the present invention is to provide a rotational sensor of microscopic dimension whose principle of operation is based on the effect rotational motion has on the propagation of electromagnetic wave along a closed path, commonly referred to as the Sagnac effect.

Herein "micro-ring cavity laser" means any closed path that can support counter-propagating electromagnetic waves, is capable of generating light by stimulated emission of radiation, and comprises a magneto-optical material. The light amplifying medium may make up a portion of, or the entire closed path. The term "micro" means that the effective radius of such closed path is less than about 1000 microns. Preferably, the closed path has a radius of between about 20 microns and about 300 microns. In the case where a non-circular closed path is used, preferably the path length is between about 100 microns and about 2000 microns in length. This provides a preferred balance of sensitivity and manufacturability for the gyros of the invention. The device has to be sufficiently large in order to have sensitivity of practical value. As the sensitivity scales with size, the smaller the device, the lower the sensitivity; see for example equation (4) in W. W. Chow, et al, IEEE Journal of Quantum Electronics, vol. QE-16, No 9, September 1980. In particular, a device 1000 times smaller exhibits 1000 times lower sensitivity. Given that ring gyros of several meters across can sense rotation with an accuracy of $10^{-7}$ degrees per hour, (see for instance G. E. Stedman, et al, Phys. Rev. A, vol. 51, June 1995, p 4944.) a 50 micron radius device should be capable of sensing rotational speeds with an accuracy of 0.01 degrees per hour. This sensitivity would still be of practical value. On the other hand, in order to be lightweight, unobtrusive, and integrable into a variety of systems, the device has to be small. Hence the preferred upper limit on the size of the device.

Preferred micro-ring cavity lasers for the invention are integrated solid state lasers. Lasers that are circular, triangular, square and polygons in geometry are preferred. Other preferred lasers take the form of a disc on a pedestal and a ring on a pedestal. Micro-ring cavity lasers and various means to construct them are discussed by Ho, et al. and Jezierski, et al. described above.

The magneto-optical material within the closed path changes its optical properties in an applied magnetic field and thus will influence the properties of the electromagnetic standing wave passing through the closed path. The magneto-optical material may make up a portion of, or the entire closed path. The magneto-optical material may be the light amplifying medium or it may be a separate medium within the closed path. Preferably the light amplifying medium comprises the magneto-optical material. Preferred light amplifying mediums are selected from the group GaAs, AlAs, InP, and InGaAs, all of which are optionally doped with Cd, Mn to enhance the magneto-optical response. Preferred magneto-optical materials for the closed path have a Verdet constant, which is a measure of the strength of the magneto-optical response, of greater than $1 \times 10^{-5}$ radians/Tesla-mm, and more preferred are materials with a Verdet constant of about 0.01 radians/T-mm or higher. A most preferred material for the light amplifying region is GaAs, having a Verdet constant of 0.1 rad/T-mm at about 1 micron wavelength. Verdet constants are known for many materials, see for instance, CRC Handbook of Chemistry and Physics, 82nd ED., CRC Press, New York, p 12–163.

By "Electromagnetic standing wave" we mean the superposition of at least two counter-propagating, sinusoidally variable in time, light waves of similar amplitude, frequency and polarization. As a result of this superposition, identifiable nodes, or points of minimum amplitude of the oscillating electric field are formed, as well as anti-nodes, or points of maximum amplitude of the oscillating electric field are formed. If the frequencies of the two counter-propagating waves as well as their speeds are exactly identical, the nodes and the anti-nodes are at rest. A small deviation in frequency and/or in the speed of propagation results, in general, in the movement of the nodes and anti-nodes. For the purpose of this disclosure, the situation where the nodes move slowly as compared to the speed of propagation of one of the component waves, is also covered by the term 'electromagnetic standing wave.' Preferred wavelengths of the light waves are between about 0.1 to about 10 microns and more preferred are wavelengths between about 0.35 to about 2.0 microns.

By "Standing wave detection means" we mean any device capable of detecting the position of the nodes or anti-nodes of an electromagnetic standing wave. One such device, and a preferred means for the invention, comprises one or more waveguides in combination with a photodetector. The waveguide is positioned so as to be evanescently coupled to the cavity where the standing wave is formed. Each waveguide diverts a fraction of energy carried by one or more of the counter-propagating waves. The fractions of energy are merged by appropriately merging the waveguides which creates a signal proportional to the superposition of the counter-propagating waves. A photodetector, appropriately placed, detects the signal. The amplitude of the traveling wave depends on the amplitudes of the counter-propagating waves as well as on their relative phase. Hence, if the amplitudes of the counter-propagating waves are kept constant, the photodetector will produce a signal dependent on their relative phase, as in an interferometer. On the other hand, the relative phase between the counter-propagating waves determines the position of nodes and anti-nodes of the standing wave inside the cavity. Thus, the photodetector will sense the position of nodes of the standing wave.

For electrically pumped solid state micro-ring cavity lasers, another preferred standing wave detection means comprises one or more electrodes on the micro-ring cavity laser capable of both pumping the micro-ring cavity laser and providing for sensing the voltage which can be correlated with the position of the standing wave. It relies on the measuring of voltage on the pumping electrodes. In order to excite and sustain the electromagnetic standing wave inside the cavity, power has to be provided. For an electrically pumped system, the power is delivered in the form of electric current. Thus, an electrode is placed across the ring cavity and supplied with a constant current from a current source. If a node of the standing wave is directly under the electrode, the resistance for the electric current is different than when an anti-node is there. Thus, by observing the voltage on the electrode, it is possible to determine whether a node or an anti-node is directly under it.

By "means for generating magnetic field" we mean any device producing magnetic field. For a constant magnetic field, a permanent magnet can be used. Preferably the means for generating a magnetic field is capable of generating a variable magnetic field. To produce variable magnetic field, an electromagnet, comprising a length of coiled conductor carrying electric current is preferred. Specific examples of preferred electromagnets are solenoids and toroids. In order to immerse the cavity in magnetic field, the entire device can be placed inside the coil. Alternatively, a micro-coil can be placed locally in the immediate vicinity of the cavity using standard hybrid integration technology, like e.g. flip-chip bonding processes.

By "lock-in phenomenon" we mean the result of coupling of the counter-propagating waves whereby the standing wave appears to be locked to the ring cavity and moves in sync with it at slow cavity rotations.

The "sensitivity axis" of a gyroscope is a straight line such that rotation around any axis with a projection along said sensitivity axis of the gyroscope can be detected.

Herein "substrate" refers to a bulk of solid material with at least a portion of the surface substantially flat. Typically, a substrate is obtained by slicing a monocrystal of semiconductor into thin wafers. Preferred materials are compounds of elements belonging to groups III and V of the periodic table of elements, doped with other elements as necessary in order to modify the electro-optic and magneto-optic properties of the material. Specific substrates that are preferred are GaAs and InP.

Herein "light amplifying medium" means any medium that produces optical gain for light passing through it. Various methods for light amplification are widely known in the art. A preferred solution in the context of this disclosure is a semiconductor medium such as a quantum well heterostructure. Quantum well heterostructures are widely known in the art. Preferred materials used to realize them are GaAs, AlAs, InP, and InGaAs.

The present invention is broadly drawn to a micro-ring cavity gyroscope with a sensitivity axis, for sensing rotational motion, comprising: at least one micro-ring cavity laser comprising a light amplifying medium and magneto-optical material capable of generating an electromagnetic standing wave; at least one standing wave detection means; and means for generating a magnetic field that at least partially immerses said micro-ring cavity laser in magnetic field, wherein said standing wave detection means senses the position of the electromagnetic standing wave with respect to said micro-ring cavity laser, and the magnetic field perturbs the electromagnetic standing wave to minimize lock-in phenomenon enabling detection of rotational motion.

The principle of operation of the device can best be understood by considering a perfect circular resonating cavity. Such a resonating cavity supports a discrete set of electromagnetic standing waves, also called modes. If one of the modes is excited inside of the resonant cavity (e.g., by lasing action), two counterpropagating electromagnetic waves can form. In general, the frequency (wavelength) of the counterpropagating electromagnetic waves will be the same. These counterpropagating electromagnetic waves interfere to give a standing wave. Nodes are the points in the standing wave where the electromagnetic field is a minimum.

The nodes of the standing wave remain stationary unless the micro-ring cavity experiences any rotational motion with respect to an inertial reference frame. If the micro-ring laser cavity is rotated, each of the counterpropagating electromagnetic waves experiences a different phase-shift, which is referred to as the Sagnac effect. The phase shift in combination with the micro-ring cavity mode conditions cause the counterpropagating waves to shift to different frequencies. Consequently, the interfering waves experience a beat frequency, which manifests itself as a relative motion of the nodes with respect to the micro-ring cavity. By sensing the change in position of the nodes inside the cavity, the rotation rate of the micro-ring cavity can be inferred. A single ring cavity is sufficient to sense the rotation around the cavity symmetry axis. In order to sense the rotation around an arbitrary axis, at least three such devices are necessary with their symmetry axes non-coplanar.

The behavior of a real ring cavity differs from the ideal case in, at least, two important respects. First, the excited mode will decay in a finite time due to energy losses. Second, the cavity imperfections cause backscattering of light inside of the cavity yielding standing wave lock-in, that is movement of the standing wave in-sync with the cavity at slow rotations, which makes the device insensitive to low rotational speeds.

The first of the problems is dealt with by introducing light amplifying medium inside the cavity, the purpose of which is to offset any radiative and nonradiative losses in the standing wave energy. The active medium requires external power supply in order to operate, which can be delivered by pumping the medium optically or electrically.

The second problem of lock-in is dealt with in this invention by the novel application of a magnetic field. The invention is further illustrated in discussion of the following figures.

Figure 2:
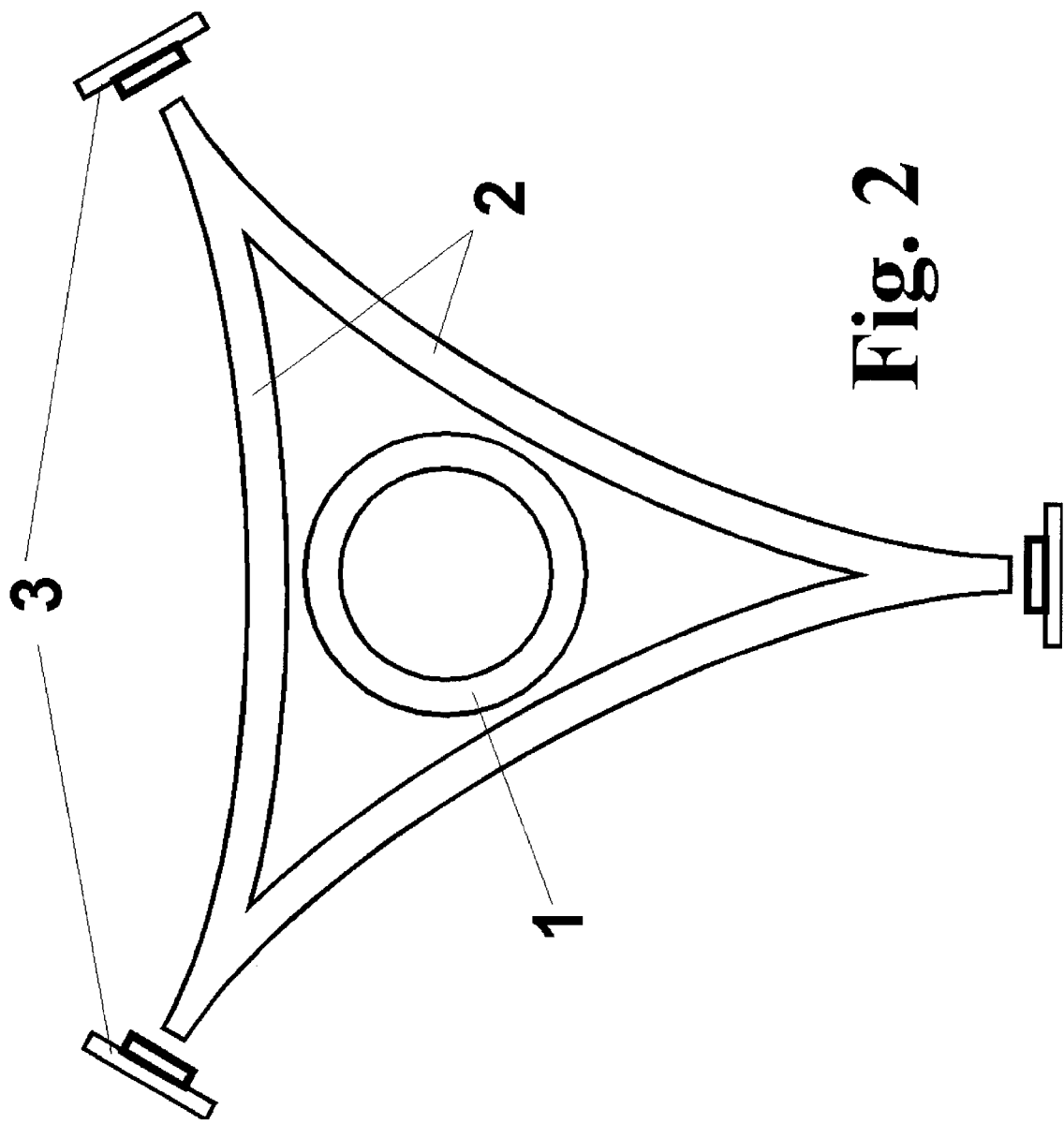
FIG. 2 illustrates a top-down view of a micro-ring cavity laser and standing wave detection means.
Figure 3:
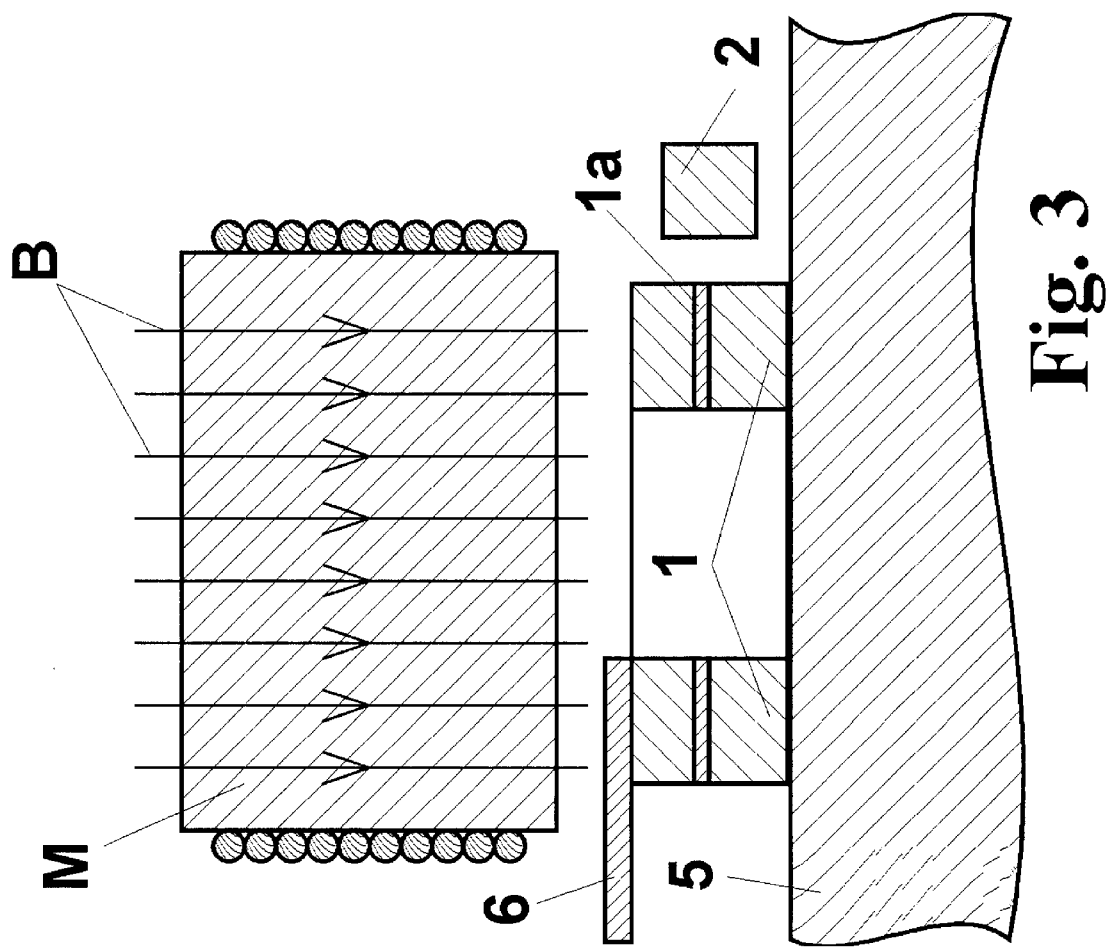
FIG. 3 illustrates a cutaway view of the micro-ring cavity gyroscope of the invention.

FIGS. 1 through 3 shows schematically various views of the micro-ring-cavity gyroscope of the invention. It consists of a resonating cavity 1, waveguides 2 evanescently coupled to resonating cavity 1, and photodetectors 3 placed at the outputs of waveguides 2. A magnet M, as in FIG. 3, provides a magnetic field B. Resonating cavity 1 is mounted on a substrate 5 and has a light amplifying region 1a, which in this case is a quantum well heterostructure. An electrode 6 provides necessary electric power to excite and sustain the electromagnetic standing wave inside resonating cavity 1.

The device works as follows. Electrode 6 is biased with a constant current source so as to provide power necessary to generate light in amplifying region 1a. Resonating cavity 1 provides necessary feedback for stimulated emission in amplifying region 1a, so that a ring cavity laser is formed. The laser generates waves traveling clockwise and counterclockwise in cavity 1. Light produced inside cavity 1 is confined to it since the refractive index of the medium where it originates is higher than the refractive index of the surrounding medium and substrate 5. The superposition of clockwise and counterclockwise traveling waves of the same wavelength and amplitude produces a standing wave inside cavity 1. The electromagnetic field generated and sustained in cavity 1 couples evanescently to waveguides 2. The arrangement of waveguides 2 and photodetectors 3 guarantees that the wave arriving at each of photodetectors 3 is proportional to the superposition of the clockwise and the counterclockwise traveling waves. Hence, if the standing wave inside cavity 1 moves, which is equivalent to the relative phase shift between the clockwise and the counterclockwise waves traveling inside cavity 1, photodetectors 3 will observe it as a variation in intensity of light arriving at their site. In effect, each of photodetectors 3 detects the power of the standing wave at the point in cavity 1 closest to its position.

If cavity 1 as well as waveguides 2 and photodetectors 3 rotate at the angular speed $\Omega$ clockwise around the cavity 1 axis, with respect to an inertial frame, the standing wave sustained in cavity 1 will rotate at the angular speed $(1-1/n)\Omega$ with respect to the inertial frame, where n is the effective refractive index of the cavity material. This rotation will be observed by each of detectors 3 as oscillations in the detected power. The frequency of these oscillations is proportional to the angular speed $\Omega$ at which the cavity rotates with respect to the inertial frame. Hence, by measuring the frequency of the optical power detected by each of photodetectors 3, one will be able to infer the angular speed $\Omega$.

Magnet M provides a means for generating a magnetic field, positioned to immerse the micro-ring cavity laser in part, or in whole, in a magnetic field. The magnetic field's role is to introduce nonreciprocity into the propagation of light inside the laser cavity, by means of the magneto-optic, or Faraday, effect. When light, in the form of linearly polarized plane wave, propagates through a magneto-optic medium immersed in magnetic field parallel to the direction of propagation, the plane of polarization undergoes rotation. This phenomenon can be understood by asserting that the circular polarized light propagates through the medium at different speeds depending whether it is polarized clockwise or counterclockwise. Since a linearly polarized light is a superposition of a clockwise and a counterclockwise circularly polarized light, the rotation of linear polarization follows. We refer to this here as a longitudinal Faraday effect because a component of the magnetic field must be parallel with the direction of light propagation. In the invention herein, when the longitudinal Faraday effect is used to introduce nonreciprocity into the propagation of light, the magnetic field preferably is a nonuniform or gradient field across the plane of the micro-ring cavity laser or the cavity is nonuniform along the closed path as, for example, FIG. 7 or FIG. 8. In this way the magnetic field effect on the propagating waves does not cancel in circumventing the closed path.

If light is confined to a closed path in a plane in a dielectric cavity, and a magnetic field is parallel to the axis of the closed path as shown in FIG. 3 then, in analogy to the case described above, the wave moving clockwise will propagate at a different speed than the wave propagating counter-clockwise. This follows from a theoretical analysis of a modified wave equation cast in cylindrical coordinates. The only requirements are the presence of a light-confining structure, which directs the electromagnetic wave to travel along an arc, the presence of a magnetic field with a component substantially perpendicular to the plane of the arc and the presence of a component of light polarized perpendicular to the magnetic field. We refer to this effect as a transverse Faraday effect.

Analysis of an example of the transverse Faraday effect in a simplified geometry, amenable to analytical treatment, shows that an axial magnetic field has a sizable effect on the beat frequency, $\Delta v$, the difference in frequency between the two counterpropagating waves. In this example GaAs is the cavity material. The material parameters important in this analysis are the refractive index n=3.5 and the Verdet constant V=0.1 rad/T-mm at the wavelength of about 1 $\mu$m (see the Handbook of Optics, vol. II, p. 36.47, second edition, McGraw-Hill). For the system we use an axially symmetric geometry: we assume that the cavity is in the form of an infinitely long cylinder made of GaAs. In order to simplify the analysis, we assume that there is not z-dependence of the electromagnetic field, where z is the axis of the cylinder. To further simplify calculations, we assume perfect electric conductor boundary conditions, which imply that the tangential component of the electric field vanishes at the surface of the cylinder. We then solve the Maxwell's equations, assuming the absence of free charges in the material, inside the cavity twice: once in the presence of a constant axial magnetic field and once in the absence of that field. The solutions are sought for the TE (transverse electric) mode where the electric field has no z-component. The two solutions, which have the same azimuthal and radial mode numbers differ in frequency. This frequency difference is one half of the beat frequency that would result from the interference of counter-propagating waves inside the cavity. For the diameter of the cylinder of about 50 $\mu$m, the azimuthal mode number is 550 and the radial mode number is 1, which correspond to a whispering gallery mode. Magnetic field of 10 mT produces in this case beat frequency of about 1 MHz. This result confirms the presence of a sizeable effect of the axial magnetic field on beat frequency in a cavity made of a semiconductor material like GaAs. Therefore, this effect can be used to break the lock-in.

The transverse Faraday effect is proportional to the magnetic field and also proportional to the Verdet constant of the material. Additionally, the effect of axial magnetic field increases as the size of the cavity grows smaller. For example, for a GaAs cylinder of about 10 $\mu$m in diameter, the same magnetic field of 10 mT results in the beat frequency of about 1.7 MHz. Conversely, if we use a larger cavity, the effect diminishes.

It should be clear for those skilled in art that the condition for this transverse Faraday effect to occur is the presence of a light-confining structure, which forces the light to travel along an arc, the presence of magnetic field with a component substantially perpendicular to the plane of the arc, and a component of the light polarized perpendicular to the magnetic field.

In both the longitudinal and transverse Faraday configurations, the superposition of the two waves, which would otherwise form a standing wave, will have the nodes moving in the direction of the faster wave inside of the circular cavity. This rotation of the standing wave will take place even when the cavity itself is stationary. The magnetic field strength and time dependence is chosen so that the standing wave rotates with respect to the cavity most of the time. Consequently, lock-in effect is minimized since most of the time the relative movement of the standing wave with respect to the cavity is significant, thus the locking of the wave to the cavity does not take place. The rotation $\Omega_S$ of the standing wave as observed by photodetectors 3 is then proportional to the sum of the rotation $\Omega_B$ introduced by the presence of magnetic field B, and the term proportional to the angular speed $\Omega$ of the entire device. Knowing $\Omega_S$ (from observation), and $\Omega_B$ (e.g. by calibration when the device is stationary), it is straightforward to infer the angular speed $\Omega$ of the device. Hence, the device is capable of measuring absolute rotation even at very low rotational speeds.

A preferred way of using magnetic field to break the lock-in phenomenon is by having the magnetic field oscillate. For instance, Chow et al (W. W. Chow, et al, IEEE, 1980, p 918–935) teaches that the stability problems associated with constant biasing techniques are eliminated by alternating the bias in time. The major advantage of oscillating bias over constant bias is that for constant bias the stability of the bias has to be at least as good as the desired accuracy. Thus, if the bias provides an equivalent of 100 revolutions per second and the desired accuracy is one degree per hour, then the bias has to be maintained stable to better than one part in a hundred million [(rev. per sec)×(deg. per rev.)×(sec. per hour)=100×360×3600=1.296×10$^8$]. On the other hand, if the bias oscillates between positive and negative values, with the average over one period equal to zero, then the integration over one period of bias oscillations will result in the cancellation of the bias and yield the signal directly proportional to the rotational speed.

Figure 4:
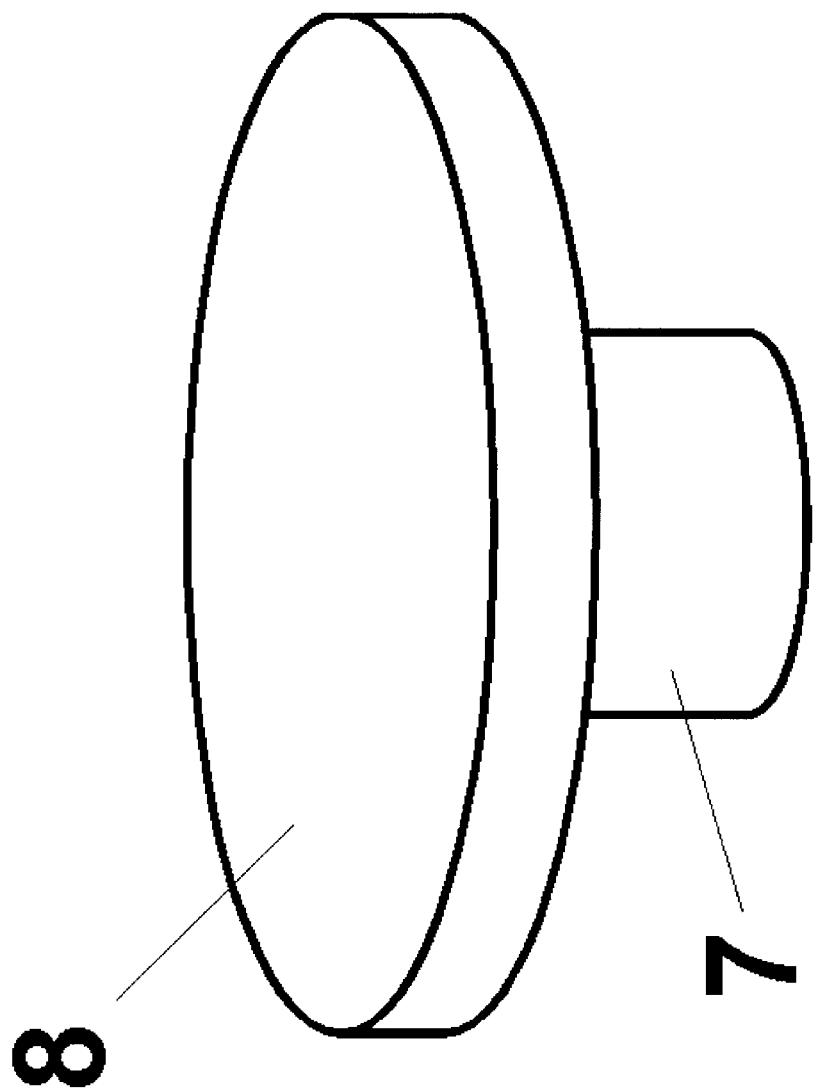
FIG. 4 illustrates a perspective view of the micro-ring cavity laser as a disc on a pedestal.

FIG. 4 shows another preferred modification of the disclosed invention, where the resonating cavity is in the form of a disc 8 on a pedestal 7. Such a microcavity semiconductor laser in the form of a disc on a pedestal is described by Ho, et al. in U.S. Pat. No. 5,825,799. A similar preferred embodiment incorporates a micro-ring cavity laser mounted on a pedestal. The embodiment depicted in FIG. 4 operates similarly to that described in FIGS. 1–3, except that the resonating cavity takes the shape of a disc. An advantage of the disc on pedestal is that light leakage to the substrate is minimized. Waveguide pickups can be used to sense the standing wave and lock-in phenomenon is eliminated in a similar way by applying a magnetic field.

Figure 5:
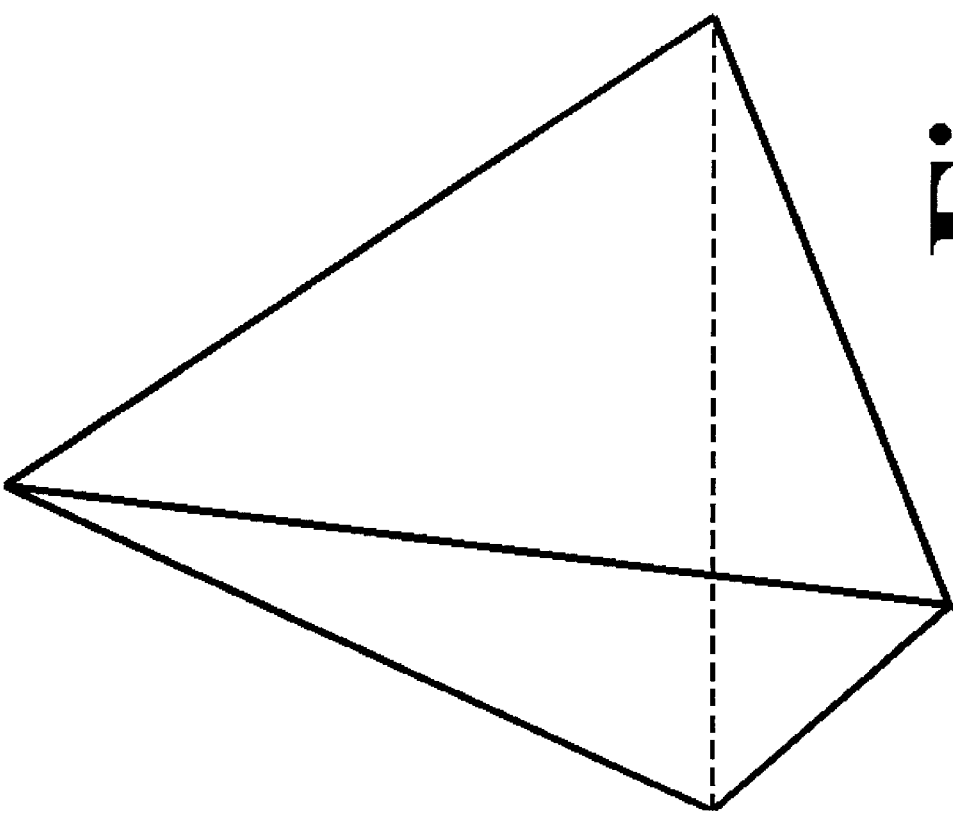
FIG. 5 is a schematic diagram of a tetrahedron upon which four micro-ring cavity gyroscopes are mounted for spatial sensing redundancy.

Another preferred embodiment of the invention is a gyroscope comprising three of more micro-ring cavity gyroscopes situated such that any subset of three gyroscopes have their sensitivity axes non-coplanar. In a more preferred embodiment, FIG. 5 shows a schematic diagram of a tetrahedron upon which four micro-ring-cavity gyroscopes are mounted on the faces of the tetrahedron for spatial sensing redundancy. Thus, the axes of the sensors lie perpendicular to the respective faces on which they are placed. In order to sense the rotation in three dimensions at least three gyroscopes with non-coplanar placement of their respective axes are required. However, if exactly three sensors are used, then the failure of one of them renders the device incapable of detecting a full three-dimensional rotation. In order to allow for sensing a full three-dimensional rotation in case of the failure of one of the devices, certain redundancy, or extra sensors are required. In the scheme proposed in FIG. 5 only four sensors are used, that is there is only one extra sensor. Still, in the case of failure of any one of the four sensors, the remaining three are capable of detecting the full three dimensional rotation since their axes are non-coplanar. On the other hand, if all devices function properly, the sensitivity is improved since the signal to noise ratio is increased by averaging among multiple devices.

Figure 6:
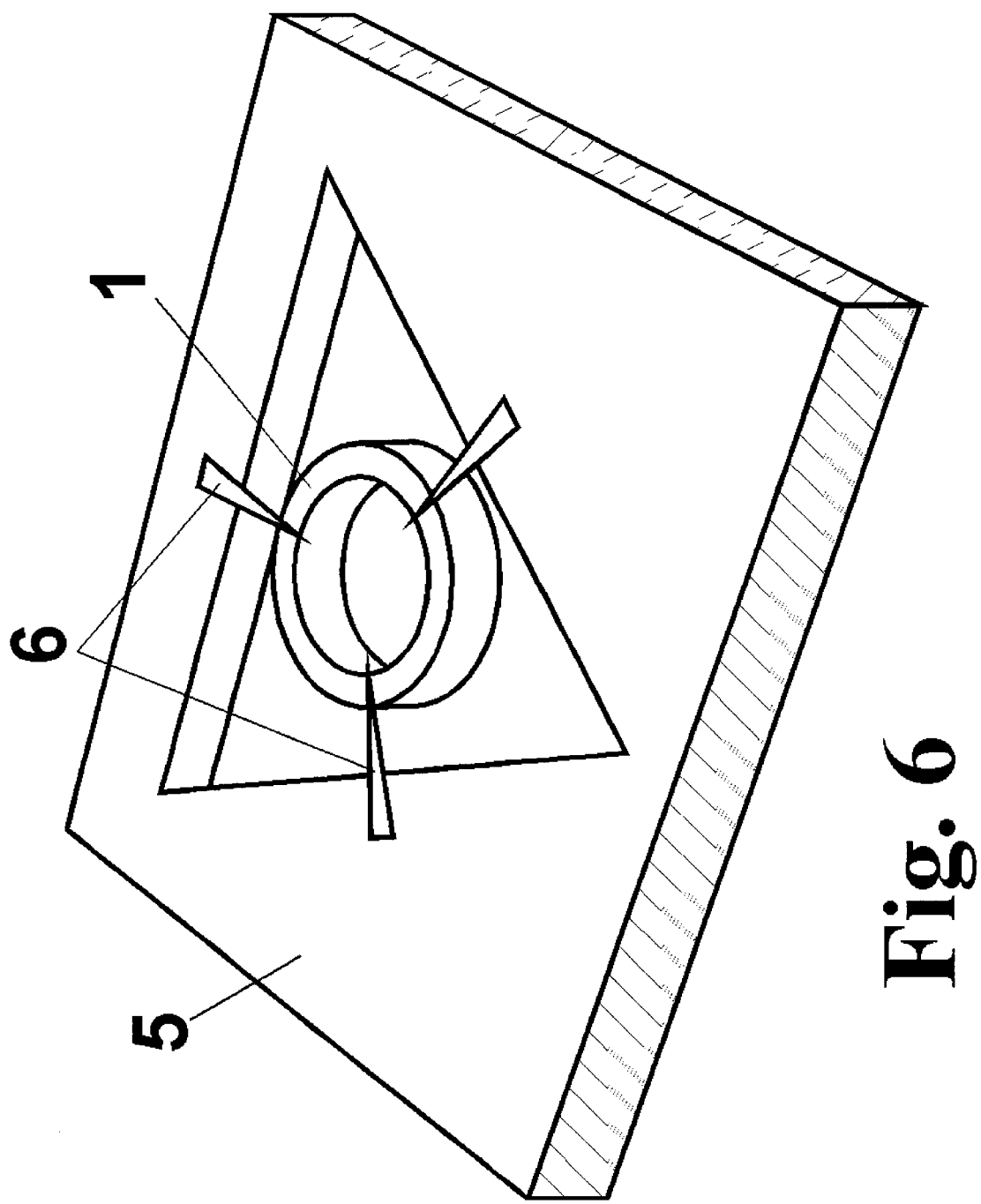
FIG. 6 is a perspective view of another embodiment of the invention where the electrodes supplying power also sense the rotation of the standing wave.

FIG. 6 shows another preferred embodiment of the invention where the sensing of the standing wave is performed by the electrical biasing circuitry, and no additional photodetectors are required. Electrical connectors 6 are placed over cavity 1. The electrodes deliver electric current so as to pump the micro-ring cavity laser, and also provide for sensing of the voltage which can be correlated with the position of the standing wave. Thus, the electrodes provide information about the position of the nodes of electromagnetic field excited in the cavity. Not shown in the figure is the means for generating the magnetic field.

In operation electrical connectors 6 are supplied with a constant current from a current source not shown in the figure. If a node of the standing wave excited in cavity 1 is directly under electrical connector 6, the resistance for the electric current is different than when an anti-node is there. Thus, by observing the voltage on electrical connector 6, it is possible to decide whether a node or an anti-node is directly under it. The rotation of the standing wave with respect to cavity 1 is then sensed by detecting the oscillations of the voltage on electrical connectors 6, which correspond to the oscillations of resistance for the electric current since constant current sources are used to bias the micro-ring cavity laser via electrical connectors 6.

Figure 7:
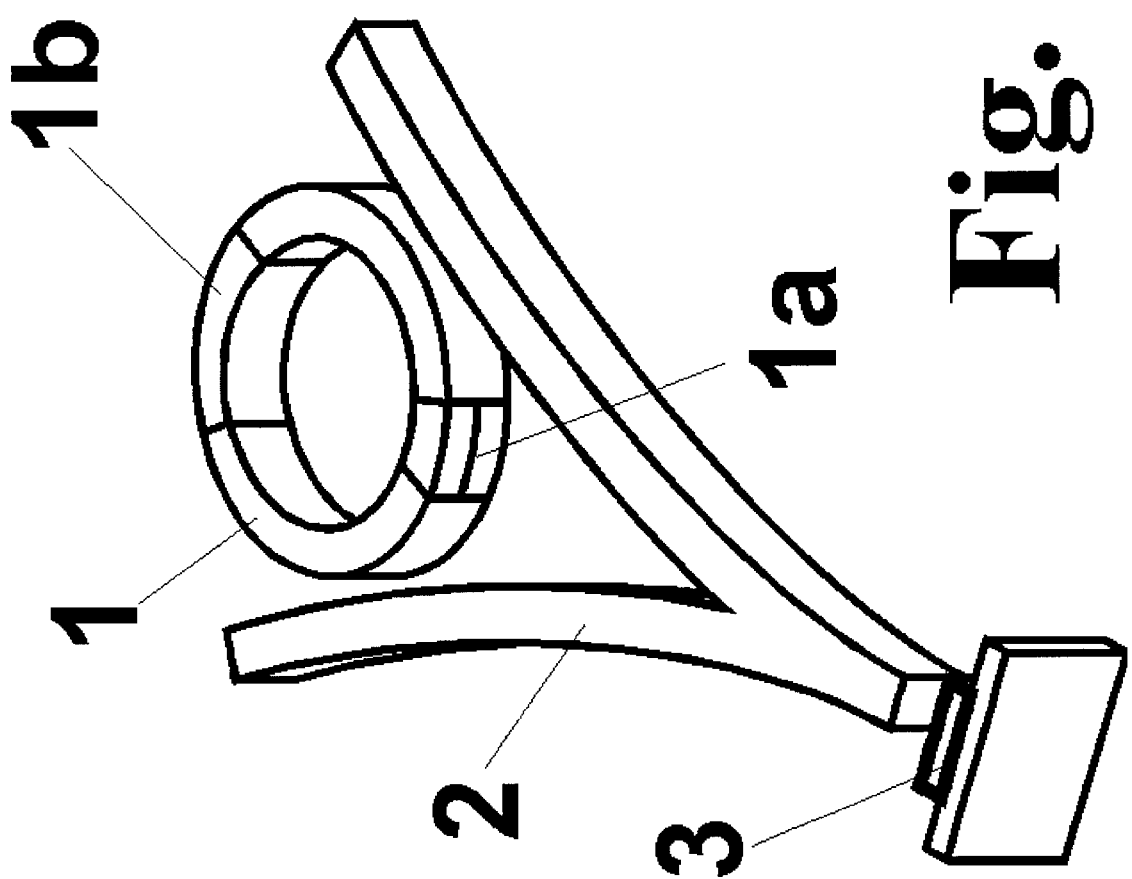
FIG. 7 illustrates a perspective view of a micro-ring cavity laser wherein the magneto-optical material is distinct from the light amplifying medium.

FIG. 7 shows another embodiment of the present invention wherein the regions in the cavity containing magnetooptical material and the light amplifying region occupy only a fraction of the cavity volume along its circumference and are explicitly spatially separated. In FIG. 7, 1a indicates the light amplifying region similar to one depicted in FIG. 3, whereas 1b indicates the magneto-optical material.

Figure 8:
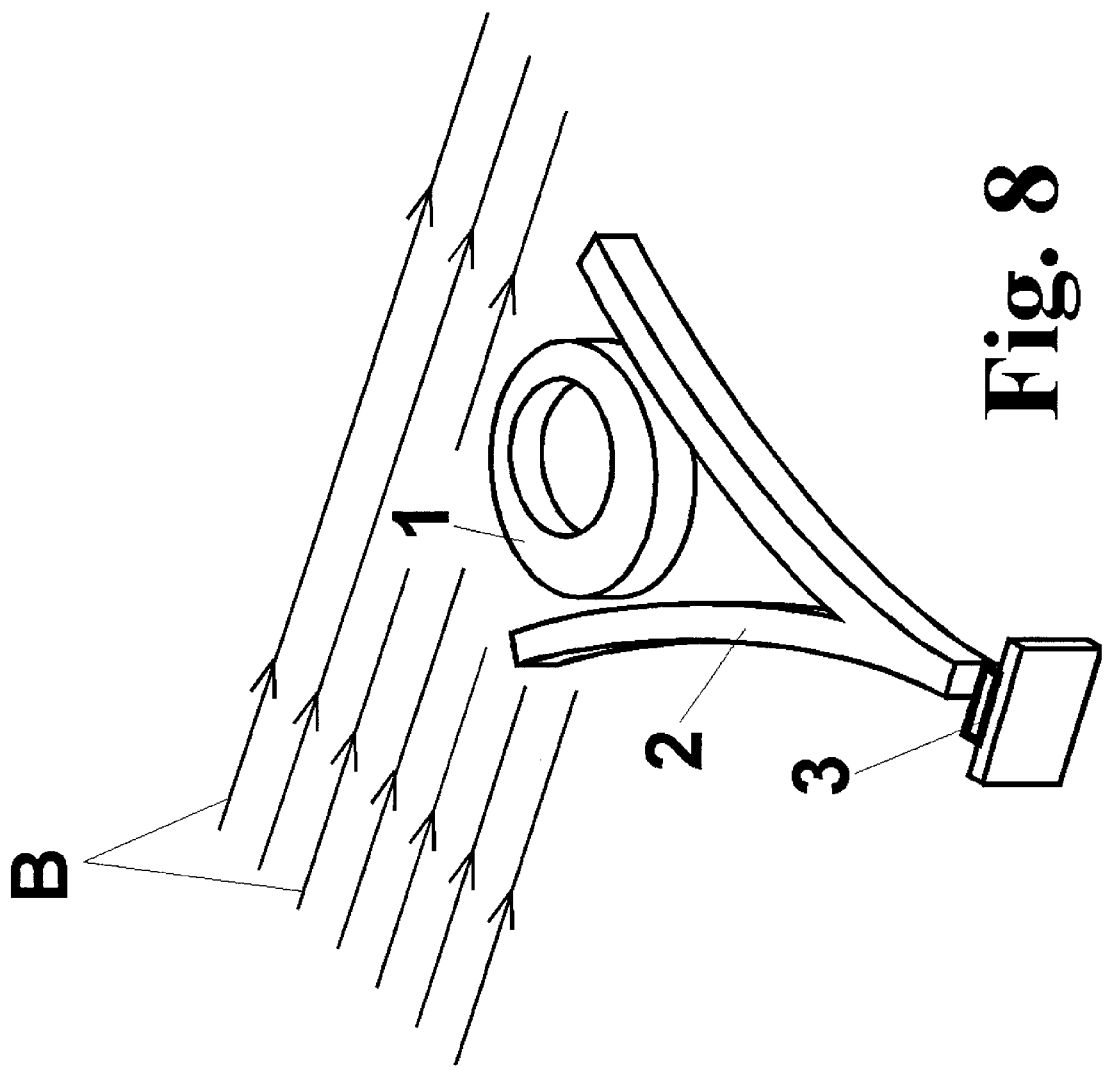
FIG. 8 illustrates another embodiment of the invention wherein the micro-ring cavity laser is nonuniform along the circumference.

FIG. 8 shows another embodiment of the invention where the ring cavity is nonuniform along the circumference. Due to the nonuniformity of the cavity, a uniform magnetic field introduces different effect in the wider portion of the cavity as compared to the narrower portion. Therefore, nonreciprocity in the beam propagation ensues, which results in the breaking of the lock-in, and thus allowing for sensing slow rotational motion. The nonuniformity of the cavity can be introduce by varying the geometry of the material as in FIG. 8, or by varying the material of the cavity as in FIG. 7, or both.

Where the micro-ring cavity has a plane of mirror symmetry, the uniform magnetic field has a component perpendicular to the plane of mirror symmetry.

Another embodiment of the invention is a process for changing the effective optical path length of an electromagnetic wave in a magneto-optical material comprising: applying a magnetic field to said magneto-optical material; propagating said electromagnetic wave through the magneto-optical material such that the electric component of the electromagnetic wave has a component perpendicular to the magnetic field; changing direction of propagation of the electromagnetic wave such that a projection of the propagation direction is perpendicular to the magnetic field whereby the effective optical path length is modified.

EXAMPLE

To make the micro-ring cavity laser gyroscope the necessary micro-ring cavity laser, waveguides, and the detectors are fabricated on a substrate. A number of methods have been developed for the fabrication of micro-ring lasers. Descriptions of the fabrication processes are available, for example, in A. F. Jezierski and P. J. R. Laybourn, Integrated semiconductor ring lasers, IEEE Proceedings, 135, (1988), pp.17–24; T. Krauss, P. J. R. Laybourn, J. Roberts, CW operation of semiconductor ring lasers, Electronics Letters, 26, (1990), pp.2095–2097; S. Oku, M. Okayasu, M. Ikeda, LowThreshold CW Operation of Square-Shaped Semiconductor Ring Lasers (Orbiter Lasers), IEEE Photonics Technology Letters, 3, (1991), pp. 588–590; and references therein.

Following the description of Jezierski, et al., a double heterostructure GaAs/GaAlAs is grown by MOCVD. Then the substrate is thoroughly cleaned and bonding pads are deposited. Deposition of the p-type contacts to the lasing structure follows. The waveguide pattern is defined by selective deposition of metal and insulating layers, which are used as self-aligning pattern for reactive ion etching (RIE) using $SiCl_4$. Insulated bonding pads are formed on heterostructure and consist of 30 nm of Ti and 200 nm of Au deposited on 200 nm of $SiO_2$. Metallic layers for ohmic contacts are deposited in the pattern of the laser and waveguide structure, and on the bonding pads. The layers consist of 30 nm of Au, 30 nm of Zn, 30 nm of Au, 100 nm of Mo and 200 nm of Au. Both contacts and bonding pads are covered with 100 nm of NiCr, which is etched away during the following dry etching process (etch rate GaAs/NiCr>80). After etching, the residue of the NiCr layer is removed by HCl. The RIE etching is performed at 13.56 MHz with a very low $SiCl_4$ flow rate of 3 sccm and at low pressure of 10 mtorr. Other etching parameters are: temperature 400° C., plate ratio 2.7, DC voltage 250 V, power 100 W, power density 0.44 $W/cm^2$. Finally, separation of the contacts and the devices is performed using a selective Au/GaAs wet chemical etch. The substrate is then machine-lapped from the back down to 100 μm thickness, and the n-type ohmic contact bonding pad is deposited. It consists of 90 nm of Au/Ge (0.88/0.12 by weight), 20 m of Ni, 30 nm of Au, 100 nm of Mo and 200 nm of Au. Subsequently the sample is annealed in reducing gas ($H_2$ 5%/Ar 95%) for about 5 s at temperature 400° C.

The photodetectors are created at the same time the lasing structures and the waveguides are fabricated on the substrate. The photodetection is carried out in the same layer of GaAs/GaAlAs heterostructure used for lasing. Ohmic contacts to the photodetectors and contact pads are created in the same way and at the same time as the ohmic contacts for the ring laser described above.

The entire device is flip-chip bonded on a glass substrate with metallization contacts and paths to control electronic circuitry bonded on the same glass substrate. Power is supplied from an external power supply. The assembly is mounted inside of a coil carrying electric current. To produce magnetic field of the order of 10 mT, as used in the example described above, would require a coil with about 100 windings per mm carrying about 100 mA current.

It will be apparent to those skilled in the art that various modifications and variations can be made in the micro-ring cavity gyroscope of the present invention and in construction of this gyroscope without departing from the scope and spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A micro-ring cavity gyroscope with a sensitivity axis, for sensing rotational motion, comprising:
    at least one micro-ring cavity laser comprising a light amplifying medium and magneto-optical material capable of generating an electromagnetic standing wave;
    at least one standing wave detection means; and
    means for generating a magnetic field that at least partially immerses said micro-ring cavity laser in magnetic field,
    wherein said standing wave detection means senses the position of the electromagnetic standing wave with respect to said micro-ring cavity laser, and the magnetic field perturbs the electromagnetic standing wave to minimize lock-in phenomenon enabling detection of rotational motion.

2. A micro-ring cavity gyroscope of claim 1 wherein means for generating a magnetic field is capable of generating a variable magnetic field.

3. A micro-ring cavity gyroscope of claim 2 wherein the means for generating a magnetic field is a coil.

4. A micro-ring cavity gyroscope of claim 1 wherein the micro-ring cavity laser is substantially circular and comprises an integrated solid state laser.

5. A micro-ring cavity gyroscope of claim 1 wherein the micro-ring cavity laser is mounted on a pedestal.

6. A micro-ring cavity gyroscope of claim 5 wherein the micro-ring cavity laser is in the form of a disc.

7. A micro-ring cavity gyroscope of claim 1 wherein said standing wave detection means comprises one or more waveguides evanescently coupled to the micro-ring cavity laser and operationally connected to one or more photodetectors.

8. A micro-ring cavity gyroscope of claim 1 wherein the standing wave detection means comprises one or more electrodes on the micro-ring cavity laser capable of both pumping the micro-ring cavity laser and sensing the voltage which can be correlated with the position of the electromagnetic standing wave.

9. A gyroscope comprising three or more micro-ring cavity gyroscopes situated such that any subset of three or more gyroscopes have their sensitivity axes non-coplanar, each micro-ring cavity gyroscope having
    at least one micro-ring cavity laser comprising a light amplifying medium and magneto-optical material capable of generating an electromagnetic standing wave;
    at least one standing wave detection means; and
    means for generating a magnetic field that at least partially immerses said micro-ring cavity laser in magnetic field,
    wherein said standing wave detection means senses the position of the electromagnetic standing wave with respect to said micro-ring cavity laser, and the magnetic field perturbs the electromagnetic standing wave to minimize lock-in phenomenon enabling detection of rotational motion.

10. A gyroscope of claim 9 comprising four or more micro-ring cavity gyroscopes situated such that any subset of three gyroscopes have their sensitivity axes non-coplanar.

11. A micro-ring cavity gyroscope of claim 1 wherein the means for generating a magnetic field is positioned to generate a component of a nonuniform magnetic field along the propagation direction of the electromagnetic standing wave, thus causing a longitudinal Faraday effect within the micro-ring cavity laser.

12. A micro-ring cavity gyroscope of claim 1 wherein the means for generating a magnetic field is positioned to generate a component of the magnetic field along said sensitivity axis, and the micro-ring cavity laser generates a standing wave with a propagation component perpendicular to the sensitivity axis, thus establishing a transverse Faraday effect.

13. A micro-ring cavity gyroscope of claim 1 wherein the the light amplifying medium comprises the magneto-optical material.

14. A micro-ring cavity gyroscope of claim 12 wherein the light amplifying medium comprises gallium arsenide.

15. A micro-ring cavity gyroscope of claim 1 wherein the micro-ring cavity laser is nonuniform along the circumference.

16. A process for changing the effective optical path length of an electromagnetic wave in a magneto-optical material comprising:
    applying a magnetic field to said magneto-optical material;
    propagating said electromagnetic wave through the magneto-optical material such that the electric component of the electromagnetic wave has a component perpendicular to the magnetic field;
    changing direction of propagation of the electromagnetic wave such that a projection of the propagation direction is perpendicular to the magnetic field whereby the effective optical path length is modified.

17. A process of claim 16 wherein changing direction of propagation of the electromagnetic wave is by confining the wave within a confining structure.

18. A process of claim 17 wherein the confining structure is a waveguide.

* * * * *